United States Patent
Adleman et al.

(10) Patent No.: US 7,815,203 B2
(45) Date of Patent: Oct. 19, 2010

(54) DUAL TAPER KNUCKLE AND DUAL TAPER ADAPTER SLEEVE

(75) Inventors: Jacob C. Adleman, Portage, MI (US); Steven T. Byrne, Portage, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 188 days.

(21) Appl. No.: 12/283,559

(22) Filed: Sep. 12, 2008

(65) Prior Publication Data

US 2010/0066047 A1  Mar. 18, 2010

(51) Int. Cl.
*B62D 7/18* (2006.01)

(52) U.S. Cl. .................... 280/93.512; 280/93.511; 403/263

(58) Field of Classification Search ............ 280/93.512, 280/93.51, 93.511; 403/263, 333, 334
See application file for complete search history.

(56) References Cited

U.S. PATENT DOCUMENTS

| | | | | |
|---|---|---|---|---|
| 1,483,282 A | * | 2/1924 | Coston | 280/93.512 |
| 1,865,202 A | * | 6/1932 | Milligan | 280/93.512 |
| 2,208,189 A | * | 7/1940 | Jones | 280/93.512 |
| 3,477,771 A | * | 11/1969 | Herbenar | 384/218 |
| 3,479,051 A | * | 11/1969 | Weiss | 280/93.512 |
| 3,563,564 A | * | 2/1971 | Bartkowiak | 280/93.512 |
| 4,491,340 A | | 1/1985 | Von Grunberg et al. | |
| 4,600,205 A | | 7/1986 | Stewart et al. | |
| 4,690,418 A | * | 9/1987 | Smith | 280/93.512 |
| 4,761,019 A | | 8/1988 | Dubensky | |
| 5,588,660 A | | 12/1996 | Paddison | |
| 5,722,784 A | * | 3/1998 | Link | 403/158 |
| 6,196,563 B1 | | 3/2001 | Haycraft | |
| 6,616,156 B1 | * | 9/2003 | Dudding et al. | 280/93.512 |
| 6,623,019 B2 | | 9/2003 | Davis | |
| 6,860,498 B2 | * | 3/2005 | McGaughy | 280/93.51 |
| 6,962,357 B2 | * | 11/2005 | McGaughy | 280/93.51 |
| 7,066,478 B2 | * | 6/2006 | Tisch et al. | 280/93.512 |
| 2004/0150181 A1 | * | 8/2004 | Gottschalk | 280/93.512 |
| 2004/0232641 A1 | * | 11/2004 | Kaiser | 280/93.512 |
| 2007/0273119 A1 | * | 11/2007 | Stoia | 280/93.512 |
| 2008/0309042 A1 | * | 12/2008 | Gercke et al. | 280/93.512 |
| 2009/0230649 A1 | * | 9/2009 | Ziech | 280/93.512 |

* cited by examiner

*Primary Examiner*—Paul N Dickson
*Assistant Examiner*—Drew Brown
(74) *Attorney, Agent, or Firm*—Marshall & Melhorn, LLC

(57) ABSTRACT

A knuckle includes two steering bosses (i.e., upper and lower), each having a continuous channel, connecting, respectively, separate channel openings where the channels taper outward from an inner diameter to each of their respective openings. A hollow first adapter sleeve is located within either one of the channel openings of the upper steering boss, and a hollow second adapter sleeve is located within either one of the channel openings of the lower steering boss. As a result of this structure, the knuckle may be used on either side of a vehicle, allow for entry of a steering arm/tie rod arm from forward to rear (rearwardly directed) or vice versa in either of the steering bosses, and may be applied to various sizes of knuckle-steer axle assemblies.

14 Claims, 4 Drawing Sheets

DUAL TAPER KNUCKLE AND DUAL TAPER ADAPTER SLEEVE

FIELD OF THE INVENTION

The present invention relates to a vehicle steering knuckle. More particularly, the present invention relates to a vehicle steering knuckle with an adapter sleeve.

BACKGROUND OF THE INVENTION

In a conventional vehicle steer axle assembly, a steering knuckle assembly may include a body, steering arms, a brake mounting plate, a spindle for a wheel hub, bearings, and a tire assembly (see, for example, U.S. Pat. No. 6,623,019 which is incorporated herein by reference). The steering knuckle is coupled to a steer axle using a separable kingpin and the steering arms are connected to steering components of a vehicle.

Typically, the steering knuckle has a forked yoke that defines first and second knuckle body bosses with aligned bores. The yoke partially surrounds one end of the steer axle which defines an axle boss having an axle bore aligned with the knuckle body bores of the knuckle yoke. The kingpin extends through a first knuckle body bore, through the axle bore, and through the remaining knuckle body bore to rotatably couple the knuckle and the steer axle together.

In these conventional steer axle assemblies, the knuckle pivots about the kingpin on a vertically inclined steering axis. Typically, bushings are disposed (for example, pressed) within the aligned bores of the knuckle body to allow the knuckle to rotate relative to the kingpin.

In addition, some knuckles have upper and lower steering bores wherein the steering arms and tie rod arms are disposed. The steering arms and the tie rod arms are utilized to control the steering of the vehicle. These knuckle steering bores are typically inclined horizontally.

Conventional steer axle assemblies, however, suffer from several disadvantages. Typically, the shapes of the knuckle steering bores are different for each side of the vehicle and the knuckle steering bores are sized uniquely for each steer axle assembly and may be sized uniquely from knuckle top to knuckle bottom, due to, for example, the assembly direction (i.e., forward to rear (rearwardly directed) or rear to forward (forwardly directed)) of entry of the steering/tie rod arm into the knuckle steering bores. As a result, separate knuckles are required for each side of the vehicle, which requires higher design, material, manufacturing, labor, inventory, and operational costs.

U.S. Pat. No. 4,761,019 to Dubensky discloses a steering knuckle fabricated of sheet metal that is usable as a left hand or a right hand steering knuckle by orienting the control arm channels to point in one direction or the other. Dubensky requires three channels that utilize ball joints to mount upper and lower control arms or tie rods and requires the control arm channels to be symmetrical about a horizontal axis so that the steering knuckle may be used on either side.

Today, knuckles need to be robust (e.g., forged steel versus sheet metal) and often require the ability to be mechanically coupled to a tie rod on both sides of a vehicle. In addition, the steering arms are not only connected to a knuckle in a forewardly directed manner but are also connected to the knuckle steering bore in a rearwardly directed manner. This, however, requires the use of different vehicle knuckles for both sides of the vehicle.

Thus, what is sought is to provide a robust vehicle steer axle assembly that does not utilize separate knuckles for each side of a vehicle, for each steer axle, or for the assembly direction of entry of the steering/tie rod arms into the knuckle steering bores. This should at least result in providing vehicle steer axle assemblies with lower material, inventory, design, manufacturing, labor, and operational costs.

SUMMARY OF THE INVENTION

A vehicle knuckle comprises a first steering boss having a first continuous channel connecting a first channel opening and a second channel opening where the first channel tapers outward from an inner diameter to each of the first and second channel openings. The knuckle further comprises a second steering boss having a second continuous channel connecting a third opening and a fourth opening where the second channel tapers outward from an inner diameter to each of the third and fourth openings. The knuckle also comprises a hollow first adapter sleeve for location within the first or second channel opening of the first steering boss, and a hollow second adapter sleeve for location within the third or the fourth opening of the second steering boss. As a result of this structure, the knuckle may be used on either side of a vehicle, may allow for entry of a steering arm/tie rod arm from forward to rear (rearwardly directed) or rear to forward (forwardly directed) in either an upper steering boss or a lower steering boss, and may be applied to various sizes of knuckle-steer axle assemblies.

Further advantages of the present invention will be apparent from the following description and appended claims, reference being made to the accompanying drawings forming a part of a specification, wherein like reference characters designate corresponding parts of several views.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
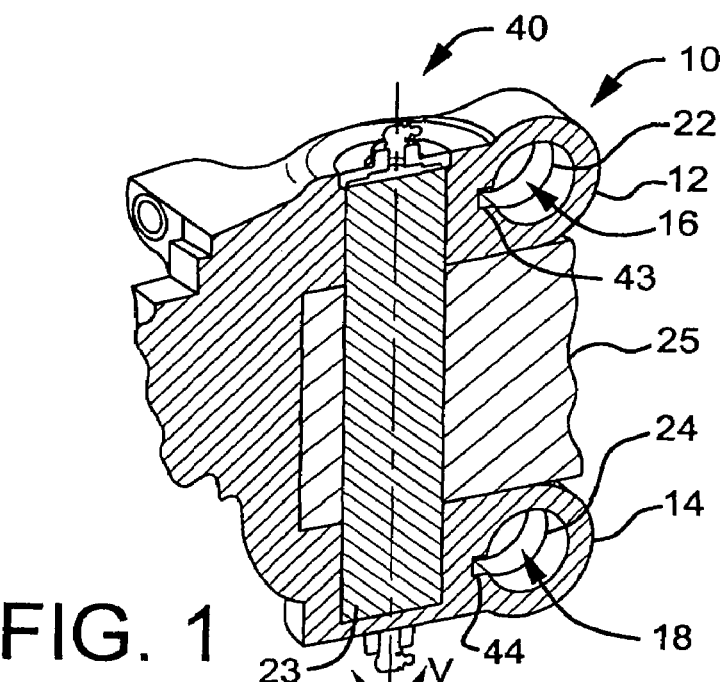
FIG. 1 is a partial three dimensional cutaway view of a knuckle in accordance with the present invention.
Figures 4, 5:
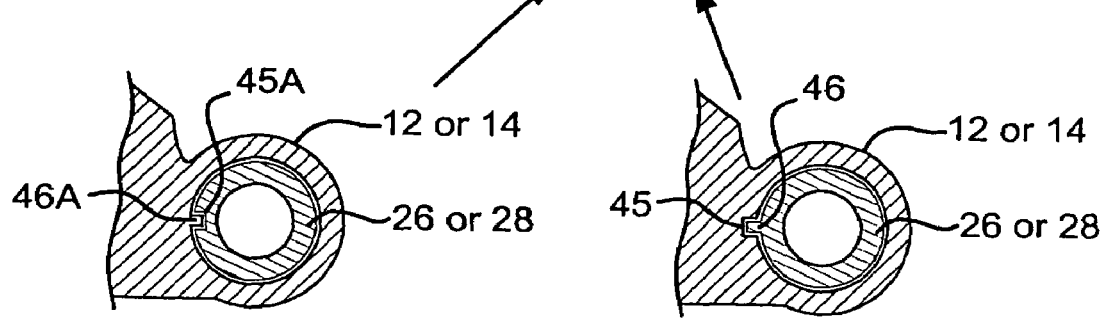
FIG. 4 is an inset of either boss of FIG. 1 with a key and a hollow adapter sleeve with a keyway.
FIG. 5 is an inset of either boss of FIG. 1 with a keyway and a hollow adapter sleeve with a key.

FIG. 1 illustrates a knuckle 10 having an upper steering boss 12 and a lower steering boss 14. The upper boss 12 has a continuous channel 16 with an opening on either side. The lower boss 14 has a lower continuous channel 18 with an opening on either side. Each channel 16, 18 tapers T1, T2, T3, T4 (which may be the same) outward to its respective opening from an inner diameter 22, 24, which is the smallest inner diameter within its respective channel 16, 18. The inner diameters 22, 24 may be half way between their respective openings on either side. The knuckle 10 may comprise forged steel.

Figure 2:
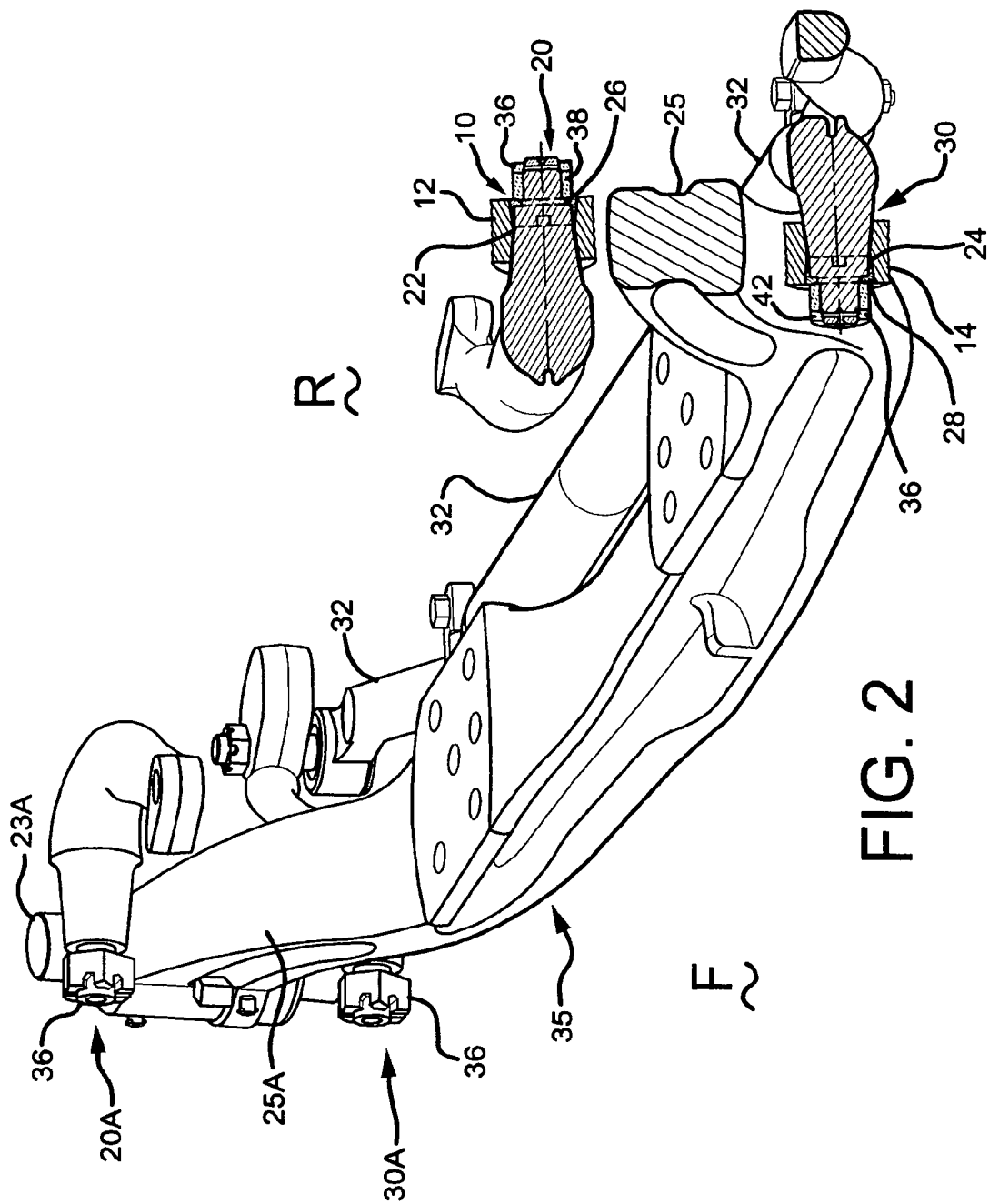
FIG. 2 is a three dimensional view of a vehicle steer-axle assembly with a partial cutaway plan view of the knuckle of FIG. 1, an upper steering arm, and a lower tie rod arm for one of the sides of a vehicle.

FIG. 2 depicts a vehicle steer-axle assembly 35 where the letter "F" designates the forward (or possibly the front) of a vehicle and the letter "R" designates the rear of the vehicle. FIG. 2 also depicts hollow adapter sleeves 26, 28, which may be similar to each other, that cooperate with the dual tapered channels 16, 18. As a result, there is provided a dual tapered knuckle 10 having dual tapered sleeves 26, 28.

Figure 3A:
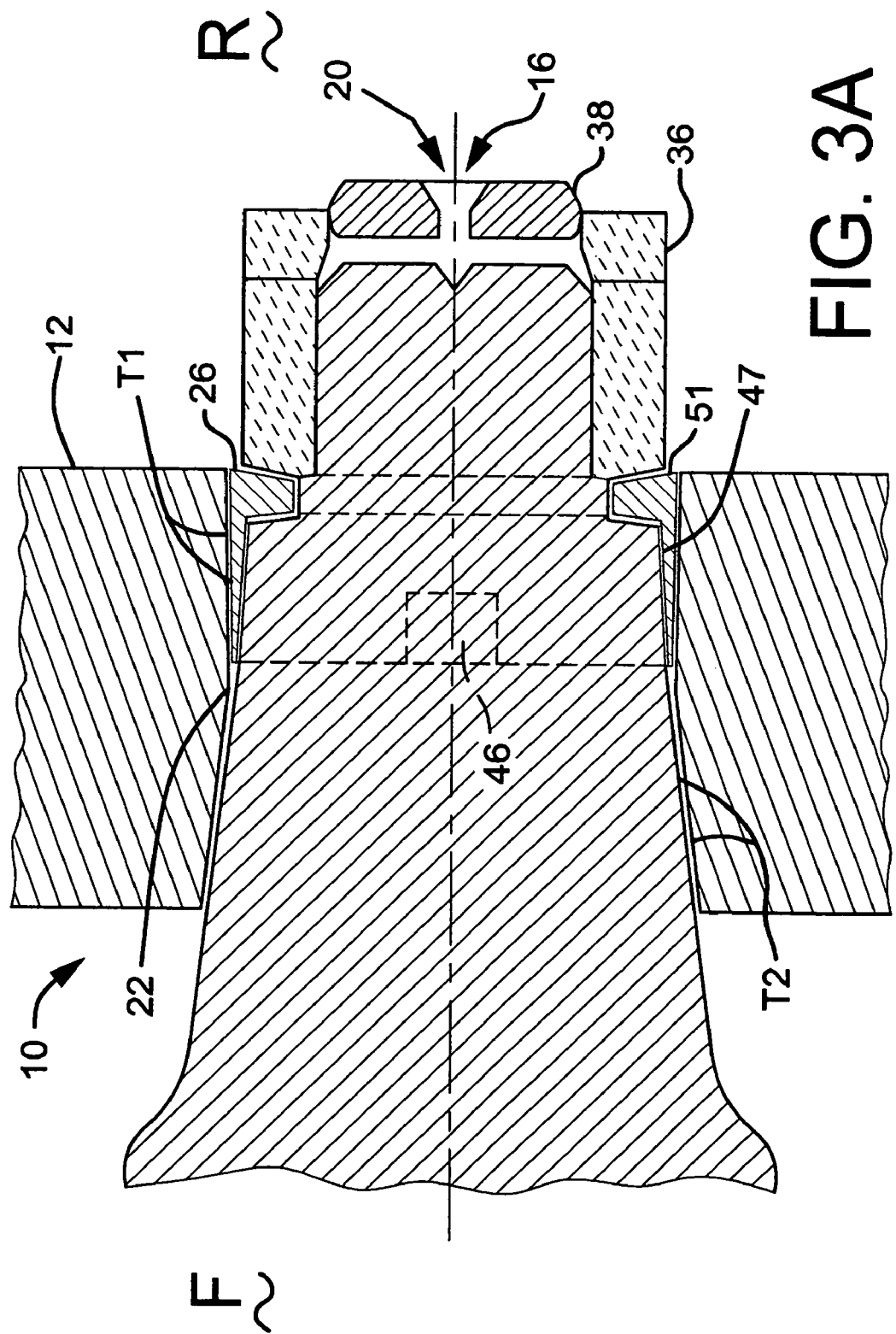
FIG. 3A is a detail partial cutaway plan view of the upper knuckle bore and an upper steering arm of FIG. 2.

The adapter sleeve 26 of FIG. 2 is further illustrated in detail in FIG. 3A, where the sleeve 26 has been directed (i.e., forwardly directed during assembly) into the rear opening of the knuckle steering boss 12. By tapering the channel 16 to both openings from the inner diameter 22, a corresponding tapered steering arm 20 has been directed (i.e., rearwardly directed during assembly) into and through the forward opening and through the hole that is through the center of the hollow adapter sleeve 26. It should be appreciated that the order of assembly could be reversed, where the steering arm 20 would be first directed into and through the front opening and then the sleeve 26 would be directed into the rear opening of the knuckle steering boss 12 and around a portion of the steering arm 20.

Figure 3B:
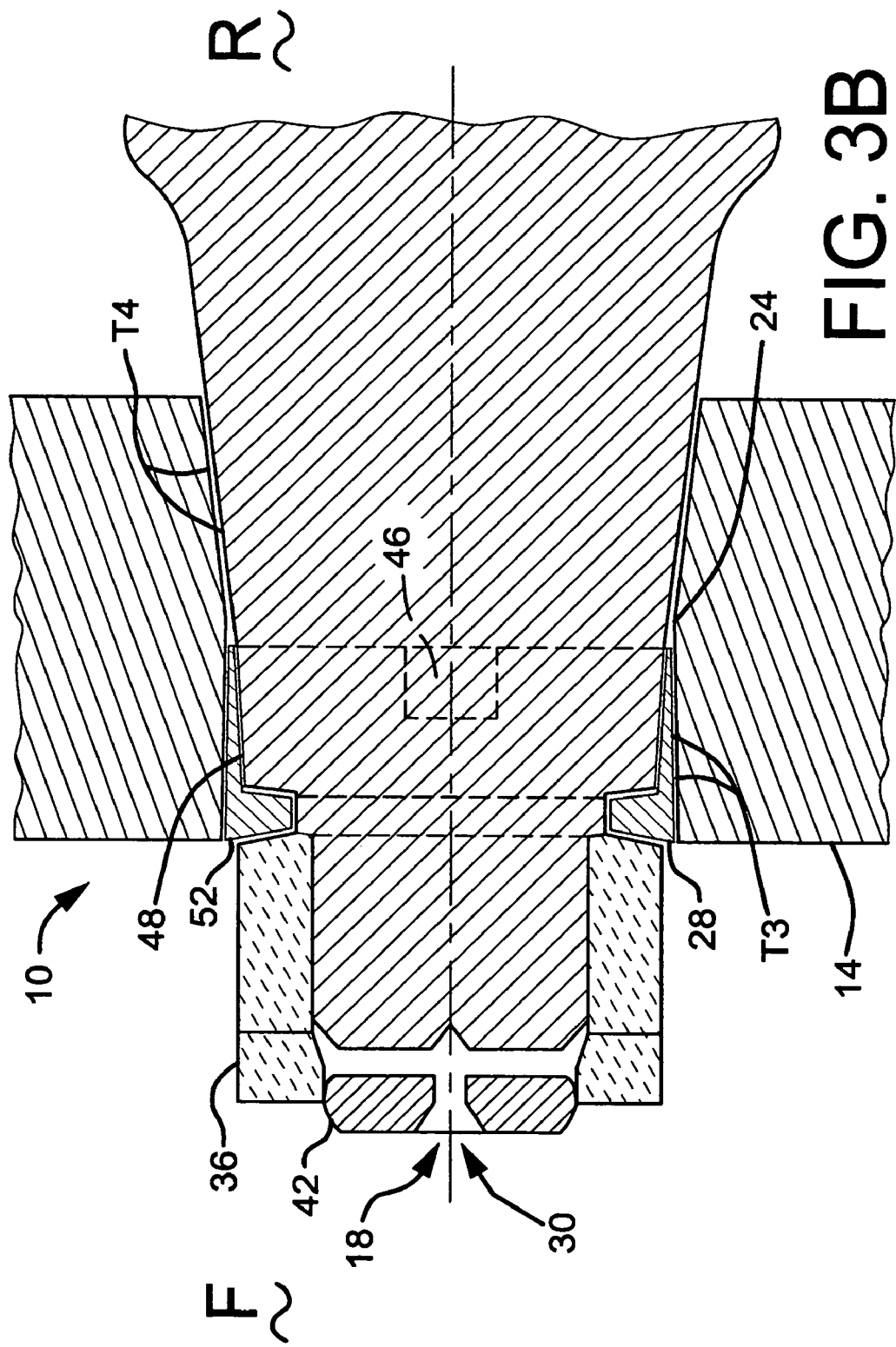
FIG. 3B is a detail partial cutaway plan view of the lower knuckle bore and a lower tie rod arm of FIG. 2.

The adapter sleeve 28 of FIG. 2 is further illustrated in detail in FIG. 3B, where the sleeve 28 has been directed (i.e., rearwardly directed during assembly) into the front opening of the knuckle steering boss 14. By tapering the channel 18 to both openings from the inner diameter 24, a corresponding tapered tie rod arm 30 is shown having been directed (i.e., forwardly directed during assembly) into and through the rear opening and through the hole that is through the center of the hollow adapter sleeve 28. It should be appreciated that the order of assembly could be reversed, where the tie rod arm 30 would be first directed into and through the rear opening and then the sleeve 28 would be directed into the front opening of the knuckle steering boss 14 and around a portion of the steering arm 30.

FIG. 2 also illustrates a different assembly for an opposite side of the steer-axle assembly 35 where a steering arm 20A is forwardly directed and a tie rod arm 30A is also forwardly directed. The tie rods arms 30, 30A are disposed at the end of the tie rod 32. Although not shown in FIG. 2, an identical opposite side knuckle (as detailed above), with channels tapered the same as channels 16, 18 and rearwardly directed upper and lower adapter sleeves, has assembled to it arms 20A, 30A which are forwardly directed as those described above.

It may be appreciated that the above-stated structure, which is depicted in FIGS. 1-3B with the direction of orientation of the sleeves 26, 28 and their oppositely directed and oriented counterpart steering arms 20, 20A, along with tie rod arms 30, 30A, allows for other possible combinations of the direction of orientation of the arms 20, 20A, 30, 30A. Thus, the knuckle 10 may be used on either side of a vehicle, may allow for entry of steering arms/tie rod arms from forward to rear or rear to forward, in either an upper steering boss or a lower steering boss, and may be applied to various sizes of knuckle-steer axle assemblies.

Subsequent to completing the direction of orientation of the sleeves 26, 28 and their oppositely directed oriented counterpart steering arms 20, 20A or tie rod arms 30, 30A, a nut 36 is assembled to the end 38 or 42 of each arm 20, 20A, 30, 30A. As a result of tightening the nut 36, the arms 20, 20A and 30, 30A, which have the corresponding tapers T1, T2 or T3, T4, cooperate with an inside surface 47 or 48 of the hollow adapter sleeves 26 or 28 that are disposed in the channel opening that is opposite the channel opening where the arms 20, 20A or 30, 30A have entered their corresponding channels. Further, the nut 36 cooperates with an external peripheral surface 51 or 52 of the hollow adapter sleeves 26 or 28. Thus, the arms 20, 20A, 30, 30A and the hollow adapter sleeves 26, 28 are secured within the channels 16, 18.

It can further be appreciated that the arms 20, 30 may be disposed within either opening in a corresponding steering boss channel 16, 18 of the knuckle 10, where the adapter sleeve 26 or 28 "fills in" the taper at the opening which is opposite to where the steering arm 20 or the tie rod arm 30 enters the knuckle channel 16, 18. Hence, the knuckle 10 can be shaped and sized the same for each channel 16, 18.

Also illustrated in FIGS. 1 and 2 are kingpins 23, 23A, which may essentially be the same, and axle members 25, 25A that are disposed at the ends of the vehicle steer-axle assembly 35. The kingpin 23 being disposed through a set of bores 40 in the upper and lower body (known as a yoke) of the knuckle 10 and the axle member 25. Thus, the knuckle 10 typically rotates about a vertical axis V in either direction about the kingpin 23 or 23A.

As FIGS. 1, 3A, 3B, 4, 5 illustrate, the bosses 12, 14 or the sleeves 26, 28 may be configured to have keys 46, 46A and corresponding interlocking keyways 45, 45A (where the keyway 45 represents the boss keyways 43, 44 in FIG. 1) that allow the keys 46, 46A, during assembly, to slide into their, but rotationally lock the sleeves 26, 28, to the bosses 12, 14 when the nuts 36 are tightened.

One skilled in the art recognizes that the keyway 45A would be disposed through an outward surface of the sleeve 26, 28, wherein the key 46A would be disposed on an inward surface of the knuckle channels 16, 18. Alternately, the keyway 45 can be disposed through the inward surface of the knuckle channels 16, 18, wherein the key 46 would be disposed on the outward surface of the sleeve 26, 28. As a result of either of these configurations, the key 46, 46A would rotationally lock the sleeves 26, 28 to the knuckle 10 when the nut is tightened.

As a result of the above-identified structure, a vehicle steer axle assembly does not require different knuckle assemblies for each side of a vehicle and for each steer axle, thus providing a vehicle steer axle assembly with lower material, inventory, design, manufacturing, labor, and operational costs. In addition, through the use of such a common knuckle 10 on each side of a vehicle, replacement time by service personnel may be reduced.

FIGS. 3A, 3B, 4, and 5 are illustrated with separation between various elements (for example, between the sleeves 26, 28 and the bosses 12, 14, between the sleeves 26, 28 and the arms 20, 30, between the bosses 12, 14, and the arms 20, 30, and between the keys 46, 46A and the keyways 45, 45A) in order to clarify various surfaces and relationships between the various elements. In actuality, these elements generally abut or fit tightly against one another.

Note that, in general, throughout the subject application and, in particular, with respect to the dimensional differences between the sleeves 26, 28, the bosses 12, 14, the arms 20, 30, the keys 46, 46A, and the keyways 45, 45A, which may only be in fractions of an inch, the patent figures are not intended to be utilized to precisely measure these difference.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A vehicle knuckle, comprising:
a first steering boss having a first continuous channel connecting a first channel opening and a second channel opening, said first channel tapering outward from an inner diameter to each of said first and second channel openings;
a second steering boss having a second continuous channel connecting a third channel opening and a fourth channel opening, said second channel tapering outward from an inner diameter to each of said third and fourth channel openings;
a hollow first adapter sleeve located within said first or said second channel opening of said first steering boss; and
a hollow second adapter sleeve located within said third or said fourth channel opening of said second steering boss;
wherein each of said hollow adapter sleeves has a key or an external keyway that cooperates with the other of an internal keyway or a key of its corresponding knuckle channel to rotationally lock said hollow adapter sleeves to a knuckle.

2. The vehicle knuckle of claim 1, wherein each of said inner diameters is the smallest diameter within its respective channel.

3. The vehicle knuckle of claim 1, wherein a steering arm, having a corresponding taper that cooperates with said taper within either of said first channel opening or said second channel opening, cooperates with an inside surface of said hollow first adapter sleeve disposed in the other of said first or said second channel opening, and is secured to said first steering boss within said first continuous channel by a nut that cooperates with an external peripheral surface of said hollow first adapter sleeve.

4. The vehicle knuckle of claim 3, wherein a tie rod arm, having a corresponding taper that cooperates with said taper within said third channel opening or said fourth channel opening, cooperates with an inside surface of said hollow second adapter sleeve disposed in the other of said third or said fourth channel opening, and is secured to said second steering boss within said second continuous channel by a nut that cooperates with an external peripheral surface of said hollow second adapter sleeve.

5. The vehicle knuckle of claim 4, wherein said first steering boss is above said second steering boss.

6. The vehicle knuckle of claim 1, said bosses having vertically aligned bores outboard from said channels, said vertically aligned bores receiving a kingpin therethrough.

7. The vehicle knuckle of claim 1, wherein said tapers within each of said channels of said knuckle steering bosses are the same.

8. The vehicle knuckle of claim 7, wherein each of said inner diameters are half way between their respective openings.

9. A steering axle assembly comprising a steering axle with two ends, wherein each of said steering axle ends is rotatably coupled by way of a kingpin to a vehicle knuckle of claim 1.

10. The vehicle knuckle of claim 1, wherein said first and said third channel openings are toward the rear of said vehicle and said second and said fourth channel openings are toward the front of said vehicle, wherein further said hollow first adapter sleeve is located within said first channel opening, a steering arm is located within said second channel opening, said hollow second adapter sleeve is located within said fourth channel opening, and a tie rod arm is located within said third channel opening.

11. The vehicle knuckle of claim 1, wherein said first and third channel openings are toward the rear of said vehicle and said second and fourth channel openings are toward the front of said vehicle, further wherein said hollow first adapter sleeve is located within said second channel opening, a steering arm is located within said first channel opening, said hollow second adapter sleeve is located within said fourth channel opening, and a tie rod arm is located within said third channel opening.

12. The vehicle knuckle of claim 1, wherein said knuckle comprises forged steel.

13. A steering axle assembly for a vehicle having two knuckles, comprising;
a tie rod having two ends having a first tie rod arm and a second tie rod arm thereon;
a first knuckle comprising a hollow first adapter sleeve within a rear channel opening of a continuous channel in an upper steering boss, said channel being tapered outward from an inner diameter toward a forward channel opening and said rear channel opening;
a first steering arm within said forward channel opening of said continuous channel of said upper steering boss and within said first adapter sleeve;
a first nut to secure said first steering arm to said first knuckle;
a hollow second adapter sleeve within a forward channel opening of a continuous channel of a lower steering boss, said channel being tapered outward from an inner diameter toward said forward channel opening and a rear channel opening;
said first tie rod arm within said rear channel opening of said continuous channel of said lower steering boss and within said second adapter sleeve; and
a second nut to secure said first tie rod arm to said first knuckle; and
a second knuckle comprising a hollow third adapter sleeve within a forward channel opening of a continuous channel of an upper steering boss, said channel being tapered outward from an inner diameter toward said forward channel opening and a rear channel opening;
a second steering arm within said rear channel opening of said continuous channel of said upper steering boss and within said third adapter sleeve;
a third nut to secure said second steering arm to said second knuckle;
a hollow fourth adapter sleeve within a forward channel opening of a continuous channel of a lower steering boss, said channel being tapered outward from an inner diameter toward said forward channel opening and a rear channel opening;
said second tie rod arm within said rear channel opening of said continuous channel of said lower steering boss and within said fourth adapter sleeve; and
a fourth nut to secure the second tie rod arm to the second knuckle.

14. A method of assembling a steering assembly for a vehicle having two knuckles, comprising;
in a first knuckle, disposing a hollow first adapter sleeve within a rear channel opening of a continuous channel in an upper steering boss that is tapered outward from an inner diameter toward said rear channel opening and a forward channel opening;

directing a first steering arm through said forward channel opening of said continuous channel of said upper steering boss and into said first adapter sleeve;

securing said first steering arm to said first knuckle by way of a first nut;

disposing a hollow second adapter sleeve within a forward channel opening of a continuous channel of a lower steering boss that is tapered outward from an inner diameter toward said forward channel opening and a rearward channel opening;

directing a first tie rod arm through said rear channel opening of said continuous channel of said lower steering boss and into said second adapter sleeve;

securing said first tie rod arm to said first knuckle by way of a second nut;

in a second knuckle, disposing a hollow third adapter sleeve within a forward channel opening of a continuous channel of an upper steering boss that is tapered outward from an inner diameter toward said forward channel opening and a rearward channel opening;

directing a second steering arm through said rear channel opening of said continuous channel of said upper steering boss and into said third adapter sleeve;

securing said second steering arm to said second knuckle by way of a third nut;

disposing a hollow fourth adapter sleeve within a forward channel opening of a continuous channel of a lower steering boss that is tapered outward from an inner diameter toward said forward channel opening and said rearward channel opening;

directing a second tie rod arm through said rear channel opening of said continuous channel of said lower steering boss and into said fourth adapter sleeve; and securing the second tie rod arm to the second knuckle by way of a fourth nut.

* * * * *